(12) United States Patent
Barrera, III

(10) Patent No.: US 6,247,057 B1
(45) Date of Patent: Jun. 12, 2001

(54) NETWORK SERVER SUPPORTING MULTIPLE INSTANCE OF SERVICES TO OPERATE CONCURRENTLY BY HAVING ENDPOINT MAPPING SUBSYSTEM FOR MAPPING VIRTUAL NETWORK NAMES TO VIRTUAL ENDPOINT IDS

(75) Inventor: Joseph S. Barrera, III, San Bruno, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/177,984

(22) Filed: Oct. 22, 1998

(51) Int. Cl.[7] ........................................ G06F 15/16
(52) U.S. Cl. ................................ 709/229; 709/203
(58) Field of Search ................................ 709/229, 203

(56) References Cited

U.S. PATENT DOCUMENTS

| | | | |
|---|---|---|---|
| 5,568,487 | * 10/1996 | Sitbon et al. | ........................ 370/466 |
| 5,636,371 | * 6/1997 | Yu | ........................ 709/227 |
| 5,734,865 | * 3/1998 | Yu | ........................ 709/250 |
| 5,881,269 | * 3/1999 | Dobbelstein | ........................ 395/500.42 |
| 6,041,166 | * 3/2000 | Hart et al. | |

* cited by examiner

Primary Examiner—Krisna Lim
(74) Attorney, Agent, or Firm—Lee & Hayes PLLC

(57) ABSTRACT

In a network server that supports multiple instances of the same service, clients individually request the virtual services by using virtual network names assigned to the virtual services. The virtual network names include a locator ID (e.g., server name, IP address) and a designated endpoint ID (e.g., named pipe name, port ID). The server implements an endpoint mapping subsystem that creates new virtual endpoint IDs that are different from the designated endpoint IDs and associates the virtual endpoint IDs with the virtual network names. When a client request is received at the server, the endpoint mapping subsystem examines the virtual network name, looks up the corresponding virtual endpoint ID, and replaces the virtual network name with the virtual endpoint ID in the request. This allows more than one instance of the service to operate concurrently.

32 Claims, 7 Drawing Sheets

| 140 | Locator ID | Designate Endpoint ID | Virtual Endpoint ID |
|---|---|---|---|
| | | | |
| | | | |

*Fig. 6a*

| 142 | Server Name | Named Pipe Name | Virtual Endpoint ID |
|---|---|---|---|
| | virtual_server1 | pipe\SQL\query | \pipe\$$\virtual_server1\SQL\query |
| | virtual_server2 | pipe\SQL\query | \pipe\$$\virtual_server2\SQL\query |

*Fig. 6b*

| 144 | IP Address | Port ID | Virtual Endpoint ID |
|---|---|---|---|
| | 129.56.85.7 | 80 | 129.56.85.7:81 |
| | 129.56.85.8 | 80 | 129.56.85.8:82 |

*Fig. 6c*

| 146 | | |
|---|---|---|
| Port ID | Mapped | |
| 80 | Y | |
| 90 | N | |
| | | |

| 144 | IP Address | Port ID | Virtual Endpoint ID |
|---|---|---|---|
| | 129.56.85.7 | 80 | 129.56.85.7:81 |
| | 129.56.85.8 | 80 | 129.56.85.8:82 |

*Fig. 6d*

NETWORK SERVER SUPPORTING MULTIPLE INSTANCE OF SERVICES TO OPERATE CONCURRENTLY BY HAVING ENDPOINT MAPPING SUBSYSTEM FOR MAPPING VIRTUAL NETWORK NAMES TO VIRTUAL ENDPOINT IDS

TECHNICAL FIELD

This invention relates to host network servers for computer network systems. More particularly, this invention relates to an endpoint mapping subsystem that maps virtual network names in requests destined to virtual services on a network server into predefined virtual endpoint IDs associated with the virtual services so that one physical server can support multiple instances of the same service. This allows the service to migrate from server to server and thereby improve the service's availability and manageability.

BACKGROUND OF THE INVENTION

A host network server serves data to one or more client computers over a network. The server typically runs one or more services, each of a service type, which can be used by the clients. For example, the server might support the following service types email, web server, database, and the like. Each service is assigned a unique designated endpoint so that clients communicate with a particular service on the host computer by sending requests to, and receiving replies from, the designated endpoint for the particular service.

A client connects to a particular service, via a protocol, by specifying a locator ID and an endpoint ID that are known to both the client and the host server. Examples of common protocols include the named pipe protocol (NPP), the Transmission Control Protocol/Internet Protocol (TCP/IP), and the User Datagram Protocol/Internet Protocol (UDP/IP). For TCP/IP and UDP/IP, the locator ID is an Internet Host Address (or IP Address), and the endpoint ID is a port ID. For NPP, the locator ID is a NetBIOS name, and the endpoint ID is a named pipe name.

The endpoint ID is used to identify a particular endpoint on a machine. An endpoint is an object oh the server affected by remote operations from clients and local operations on servers. A named pipe is one example of an endpoint. A temporary file (/tmp/foo) is another example of an endpoint.

A common way for clients and services to agree on locator and endpoint IDs for a service (given a certain protocol) is to use the locator ID of the machine that the service runs on, and to use an endpoint ID permanently associated with the service type. This works because usually one service of a given service type runs per machine. As an example of permanently associating an endpoint ID with a service type, SMTP (Simple Mail Transfer Protocol) runs over TCP/IP and hardwires port 25 as the endpoint ID. As another example, clients of Microsoft's SQL Server 6.5 use the named pipe protocol and assume "\pipe\sq\query" as the endpoint ID. Even when using TCP/IP where IP addresses can be specified, protocols layered above it may not provide the option to specify the IP address (e.g., DCOM RPC (distributed component object model—remote procedure call) with TCP/IP bindings). A port can be supplied, but the address listened on is always "INADDR_ANY".

On the client site, the locator ID and endpoint ID are unique, and the endpoint ID is typically hardwired. This hardwiring is done to make things easier for the user. The user only has to specify a machine name.

Implicit in the conventional processes is the assumption that each machine will only be running one instance of the service. However, current server technology allows administrators to run multiple instances of the same service on a single machine. For example, a database administrator might wish to run multiple instances of the SQL database service so that more physical memory can be used than can be addressed by a single address space. In this case, one instance of SQL covers one address space and another instance of SQL covers another address space. To the client, each SQL instances functions as its own service running on its own machine. In this manner, the physical host server can be said to support multiple "virtual services" on multiple "virtual servers".

As another example, it is not uncommon for a Web server to support thousands of domains on the same Web service. To the client, however, each domain functions as its own service as if running on its own HTTP (Hypertext Transfer Protocol) server on its own machine. Here again, one physical host server is effectively running multiple "virtual services" on multiple "virtual servers".

A fault tolerant system in computer clustering is another context in which running multiple instances of the same service is desired. A computer cluster is made up of multiple computers interconnected by a network. Services, and data managed by the services, are distributed across the various computers in an effort to balance the load placed on any one computer. A fault tolerant system is designed into the computer cluster to accommodate failure of a computer, or component therein, within the cluster. When a computer fails, the services and resources handled by the failed computer are shifted to one or more other computers in the cluster to prevent loss of services to the clients. In this setting, there may arise a need to run multiple instances of a service on the same host machine. In the database arena, for example, a computer cluster configured to run multiple SQL services across multiple machines might be forced, due to a failure of one or more machines, to run multiple instances of the SQL service on one machine.

Unfortunately, inning multiple instances of the same service on a single machine creates a problem in how the clients connect to the instances. When multiple instances live on one machine, the endpoint IDs are no longer unique. Both the locator ID and the endpoint ID need to be considered to uniquely identify the instance of the service. However, in some API's that use the protocols (e.g., named pipe interface) the locator ID is stripped away because the location is assumed to be "here" at the local computer.

In addition, many server operating systems do not allow more than one instance of a service to bind to the designated endpoint for that service. As a result, other instances remain idle until they are bound to the endpoint. For example, such operating systems such as Windows NT operating system from Microsoft Corporation and the OS/2 operating system from IBM do not permit more than one instance of a service to bind to the designated named pipe for that service. Since only ode instance of a service is bound to the named pipe at any one time, the other instances are left idle, waiting for their opportunity to bind to the named pipe.

Abandoning the conventional protocols is not an option. Many existing client applications across many diverse platforms connect to services using the conventional protocols. Eliminating the protocols would require rewriting the client applications.

Accordingly, there is a need to improve server operating systems to enable multiple instances of a service on the same machine to bind concurrently to endpoints of the client-server protocols.

SUMMARY OF THE INVENTION

This invention concerns a protocol endpoint mapping system, which is implemented on a host server that serves clients over a network. The host server supports one or more services, each of some service type. Example service types are Microsoft SQL Server, Microsoft Exchange Server, and FTP (File Transport Protocol) server. A service is an independent instance of a service type, which may be running or not running. A client connects to a particular service, via a protocol, by specifying a locator ID and an endpoint ID that are known to both the client and the host server. Examples of such protocols include the named pipe protocol (NPP), the Transmission Control Protocol/Internet Protocol (TCP/IP), and the User Datagram Protocol/Internet Protocol (UDP/IP). Each service is assigned a unique designated endpoint so that clients communicate with a particular service on the host computer by sending requests to, and receiving replies from, the designated endpoint for the particular service.

The host server supports multiple virtual services, which are multiple instances of a single service type. The clients can individually request the virtual services by using virtual network names assigned to the virtual services. The virtual network names include a unique locator ID (e.g., server name, IP address) and the designated end point ID (e.g., named pipe name, port ID) that is specified for the service type.

The protocol endpoint mapping subsystem receives requests from the clients and maps the virtual network names in the requests to virtual endpoint IDs established for the virtual services. The virtual endpoint IDs are different than the designated endpoint ID for the generic service type and are thereby used to differentiate among the virtual services.

According to one implementation, the endpoint mapping subsystem is incorporated into an operating system of the network server. In another implementation, the endpoint mapping subsystem is constructed as a dynamic-link library that is callable by the service.

BRIEF DESCRIPTION OF THE DRAWINGS

FIGS. 6a, 6b, 6c and 6d show various table-based data structures used to correlate locator IDs and designated endpoint IDs with a new virtual endpoint ID.

DETAILED DESCRIPTION

Figure 1:
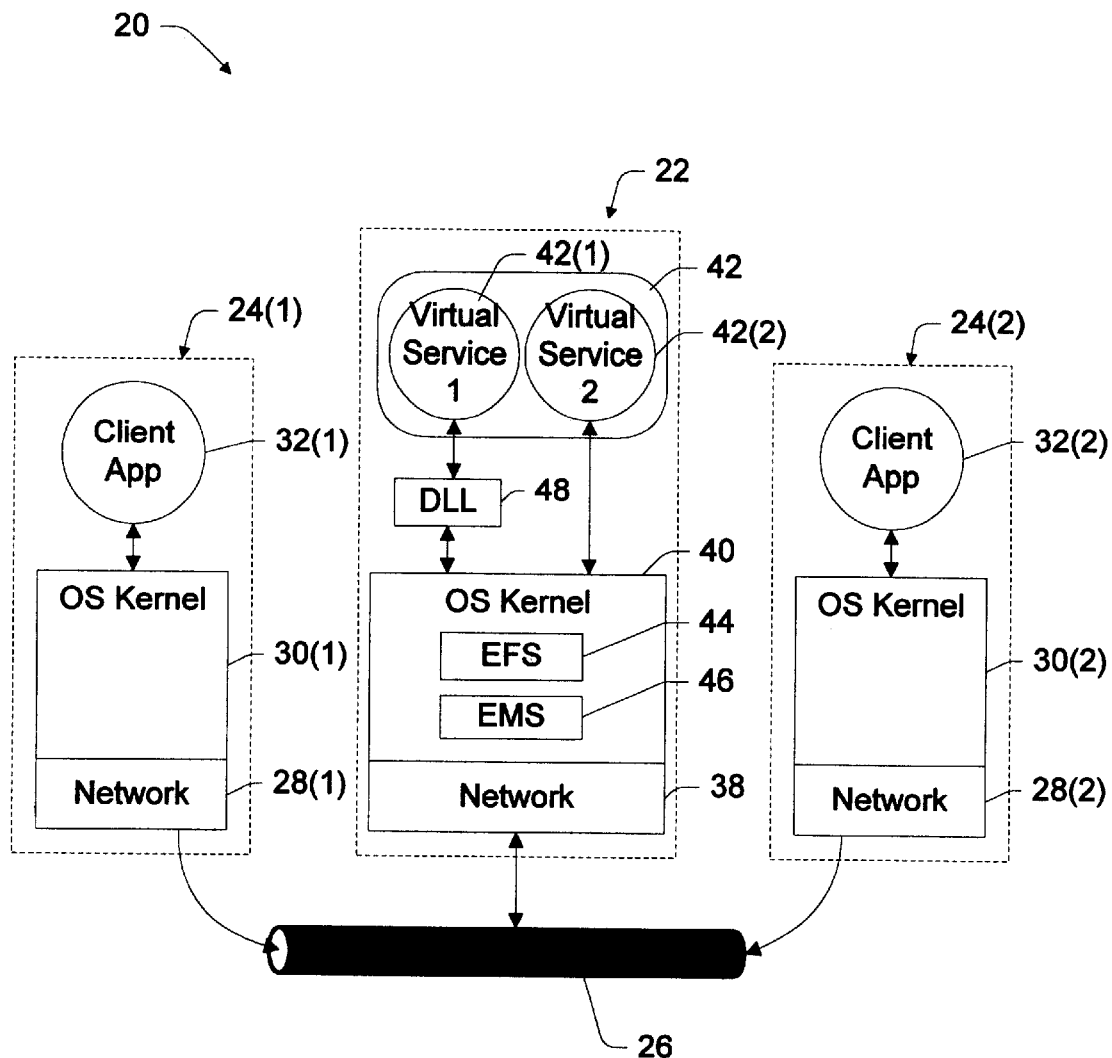
FIG. 1 shows a software architectural representation of a computer network system.

FIG. 1 shows a software architectural representation of a computer network system 20. The network system 20 has a host network server 22 connected to serve multiple clients 24(1) and 24(2) over a network 26. The network 26 is representative of many diverse network technologies (e.g., Ethernet, satellite, modem-based, etc.) and different configurations, including a LAN (local area network), a WAN (wide area network), and the Internet. For discussion purposes, the computer network system 20 is described in the context of a database system in which the network server 22 is a database server that provides database services to the clients 24(1) and 24(2) over the network 26. It is noted, however, that this invention is not limited to the database context, but may be implemented in other contexts.

Each client computer 24(1) and 24(2) has a network layer 28(1) and 28(2) that facilitates data transfer over the network 26. Each client also has an operating system (OS) kernel 30(1) and 30(2). As an exemplary implementation, the client OS kernels 30(1) ant 30(2) are implemented as a Windows brand operating system from Microsoft Corporation, such as Windows 3.1, Windows 95, Windows 98, Windows NT Workstation, and other Windows derivatives. The client computers 24(1) and 24(2) are running SQL applications 32(1) and 32(2) to enable access to the SQL server database maintained at the network server 22. The client computers may be implemented, for example, as microprocessor-based general purpose computers.

Network serve; 22 has a network layer 38 and an operating system kernel 40 atop the network layer. As one example, the operating system 40 is the Windows NT Server operating system from Microsoft Corporation, although other types of server operating systems can be used.

One or more services are supported by the server operating system 40, as represented in FIG. 1 by service 42. The services are independent instances of particular service types, such as Microsoft SQL Server, Microsoft Exchange Server, and FTP (File transport Protocol) server. In the continuing example, the service type is a SQL database service, although other exemplary types of services may be used.

The clients 24(1) and 24(2) connect to a particular service, via a protocol, by specifying a locator ID and an endpoint ID that are known to both the clients and the host server 22. Examples of such protocols include the named pipe protocol (NPP), the Transmission Control Protocol/Internet Protocol (TCP/IP), and the User Datagram Protocol/Internet Protocol (UDP/IP). Each service 42 is assigned a unique designated endpoint so that the clients 24(1) and 24(2) communicate with a particular service on the host computer by sending requests to, and receiving replies from, the designated endpoint for the particular service. The following table summarizes exemplary protocols and the associated endpoints, endpoint IDs, and locator IDs for each protocol.

| Protocol | Endpoint | Endpoint ID | Locator ID |
| --- | --- | --- | --- |
| Named Pipe | Named Pipe Queue | Named Pipe Name | Server Name |
| TCP/IP | Server-side Socket | Port ID | IP Address |
| UDP/IP | Server-side Socket | Port ID | IP Address |

In the exemplary illustration, two instances 42(1) and 42(2) are concurrently executing on the host server 22. Each instance 42(1) and 42(2) presents itself to the clients 24(1) and 24(2) as a "virtual service". Even though the virtual services are instances of the same service type on the same machine, each virtual service appears to the client as its own service running on its own machine. Hence, the service 42 is said to support multiple "virtual services"; or said another way, the host server 22 is said to present multiple "virtual servers".

Generally speaking, the operating system 40 utilizes a protocol construction to handle client requests. The operating system 40 maintains pre-known designated endpoints for the various services in an endpoint file system (EFS) 44. The server operating system 40 also implements an endpoint mapping subsystem (EMS) 46 that enables incoming requests for virtual services to be mapped from the designated endpoint for that service to other predefined endpoints. The predefined endpoints for the virtual services 42(1) and 42(2) are different than the designated endpoint for the generic service 42. It is noted, however, that the endpoint mapping subsystem 46 may alternatively be implemented as a dynamic-link library (DLL) 48 that is callable by the virtual service 42(1), and performs the endpoint mapping prior to reaching the virtual service 42(1).

Prior to this invention, the operating system used the same designated endpoint for different virtual services. As a result, only one request is handled at the endpoint at a time. Other requests remain idle in a queue and unanswered until the endpoint is available again. More specifically, request packets arriving at the host server specify a locator ID and an endpoint ID. The protocol layer (e.g., TCP) strips off the locator ID since it assumes that the host is only running one service locally that is specified by the endpoint ID. The endpoint ID is passed up to the next higher layer in the protocol stack for use in finding the service.

To illustrate this problem with in a specific context, consider the named pipe protocol. The server operating system 40 maintains well-known designated named pipes for the various services in a named pipe file system. Each named pipe has a unique name that distinguishes it from other named pipes. A pipe name that is accessed remotely over a network typically takes on the following form:

\server\pipe\service_name where "server" is replaced with the real or virtual server name and "service_name" is replaced with the name of the service. In FIG. 1, the server 22 supports two virtual SQL services. The clients 24(1) and 24(2) address the virtual SQL services 42(1) and 42(2) using the following virtual network names:

\virtual_server1\pipe\SQL\query

\virtual_server2\pipe\SQL\query

The server operating system 40 inherently assumes that only one of the instances 42(1) and 42(2) at a time can bind to the designated named pipe for the service 42. In this case, the generally designated named pipe is "\pipe\SQL\query". When the requests for the different virtual services are handled, the "virtual_serve" portion of the name is stripped off at a low protocol layer as being immaterial. That is, the operating system 40 resolves different virtual network names to the same named pipe name. Thus, the above virtual network names for different virtual services are typically (in the absence of this invention) resolved to the identical named pipe:

\\.\pipe\SQL\query

Although the problem has been described in the context of the named pipe protocol, similar problems exist for other protocols, such as TCP/IP and UDP/IP. In TCP/IP or UDP/IP, a client request typically contains a port ID and an IP address to designate a; particular virtual service. The service type for the virtual service is typically assigned just one corresponding port ID at the host computer. When the request is received, the TCP layer strips off the IP address as unnecessary since it is designating a service running on the local machine, thereby leaving only the port ID. Because the operating system uses the same designated port ID for a service type, the same port ID is applied to all of the virtual services, allowing only one virtual service to bind to the port at a time. Requests destined for other virtual services remain idle and unanswered until the port is available again and can bind to the other virtual service.

To avoid this problem, the endpoint mapping subsystem 46 maps incoming requests for virtual services from a designated endpoint for that service to other predefined endpoints. The predefined endpoints for the virtual services 42(1) and 42(2) are different than the designated endpoint for the generic service 42. The operating system 40 then binds the endpoints to the various instances 42(1) and 42(2) of the same service 42. As a result, the server can handle concurrent access to multiple virtual services.

More particularly, the client request includes a locator ID and an endpoint ID. The mapping subsystem 46 uses the locator ID to identify the virtual service and maps the endpoint ID (which is general for the service type) to a new ID associated with the vital service.

Consider the endpoint mapping subsystem 46 in the context of various protocols. For named pipe protocol, the client request contains a server name (e.g., virtual_server1) and a named pipe name (e.g., pipe\SQL\query). The mapping subsystem 46 replaces the virtual network name of a virtual service (as used by the clients 24(1) and 24(2)) with named pipe names that are used by the server 22. As one implementation, the mapping subsystem 46 is configured to insert the virtual network name string into the named pipe name. As an example, the virtual network names for virtual SQL services are mapped as follows:

| Virtual Endpoint | Map to... | New Endpoint |
|---|---|---|
| \virtual_server1\pipe\SQL\query | → | \pipe\$$\virtual_server1\SQL\query |
| \virtual_server2\pipe\SQL\query | → | \pipe\$$\virtual_server2\SQL\query |

Once mapped, the mapping subsystem 46 forwards the client request to the file system 44 using the new named pipe name. The virtual service then handles the request using the new named pipe, as opposed to the named pipe that is designated for the primary service.

For TCP/IP or UDP/IP, the client request contains an IP address and a port ID (which is general to the service type). The mapping subsystem 46 uses the IP address to identify the particular virtual service and then maps the port ID contained in the request to a new port ID. For instance, suppose the IP address is "129.56.85.7" for one virtual service and "129.56.85.7" for another virtual service. These virtual services are instances of the service type having a designated port ID "80".

| Virtual Endpoint | Map to... | New Endpoint |
|---|---|---|
| 129.56.85.7:80 | → | 129.56.85.7:81 |
| 129.56.85.8:80 | → | 129.56.85.8:82 |

Figure 2:
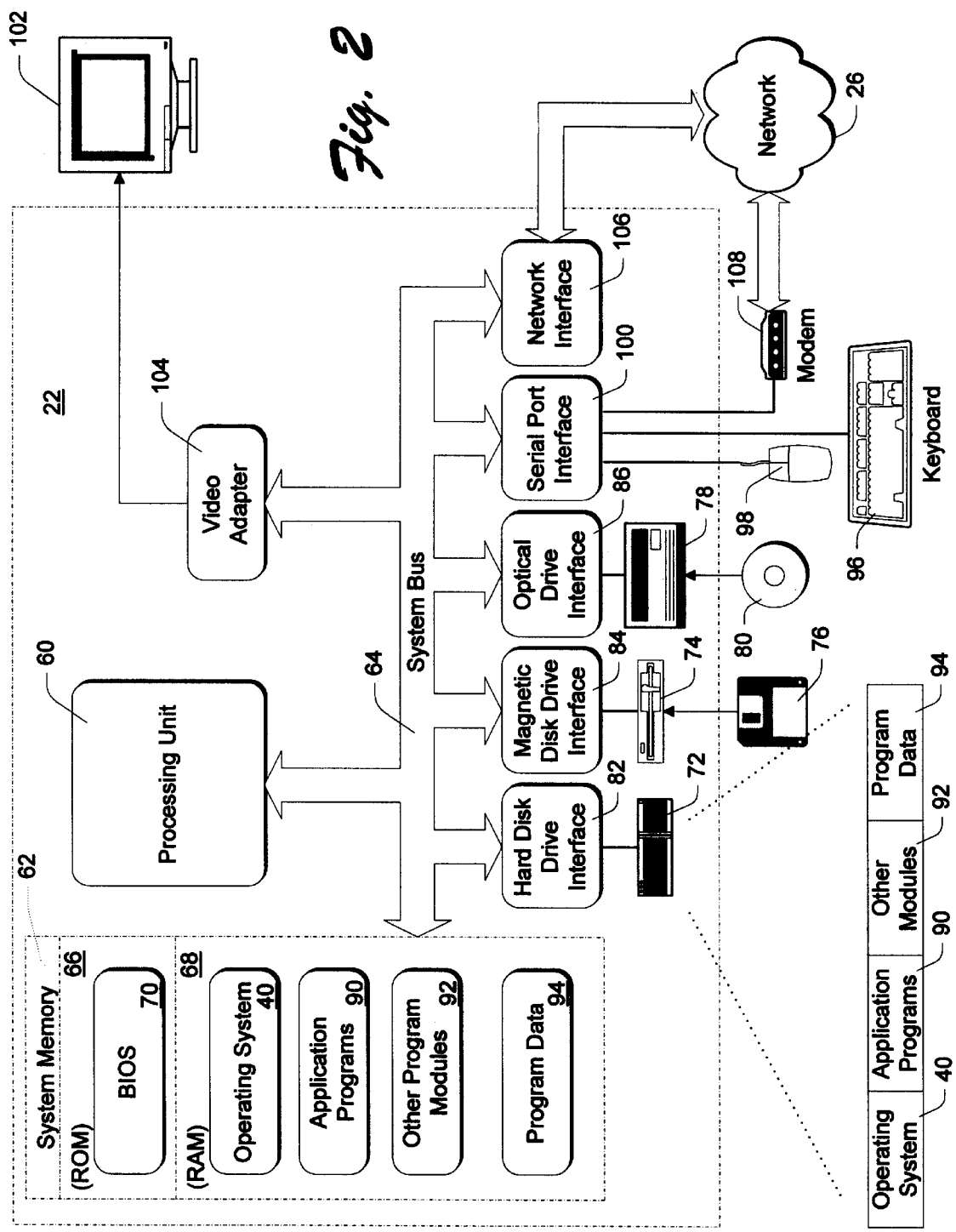
FIG. 2 is a block diagram of a server computer used in the computer network system.

FIG. 2 shows an example implementation of a host server computer 22 in more detail. The server 22 is a general purpose computing device in the form of a conventional personal computer that is configured to operate as a host network server. The server computer 22 includes a processing unit 60, a system memory 62, and a system bus 64 that couples various system components including the system memory 62 to the processing unit 60. The system bus 64 may be any of several types of bus structures including a memory bus or memory controller, a peripheral bus, and a local bus using any of a variety of bus architectures. The system memory 62 includes read only memory (ROM) 66 and random access memory (RAM) 68. A basic input/output system 70 (BIOS) is stored in ROM 66.

The server computer 22 also has one or more of the following drives: a hard disk drive 72 for reading from and writing to a hard disk, a magnetic disk drive 74 for reading from or writing to a removable magnetic disk 76, and an optical disk drive 78 for reading from or writing to a removable optical disk 80 such as a CD ROM or other optical media. The hard disk drive 72, magnetic disk drive 74, and optical disk drive 78 are connected to the system bus 64 by a hard disk drive interface 82, a magnetic disk drive interface 84, and an optical drive interface 86, respectively. The drives and their associated computer-readable media provide nonvolatile storage of computer readable instructions, data structures, program modules and other data for the personal computer.

Although a hard disk, a removable magnetic disk 76, and a removable optical disk 80 are described, it should be appreciated by those skilled in the art that other types of computer readable media can be used to store data. Other such media include magnetic cassettes, flash memory cards, digital video disks, Bernoulli cartridges, random access memories (RAMs), read only memories (ROM), and the like.

A number of program modules may be stored on the hard disk, magnetic disk 76, optical disk 80, ROM 66, or RAM 68. These programs include the operating system 40, one or more application programs 90 (such as service 42), other program modules 92, and program data 94. A user may enter commands and information into the personal computer 22 through input devices such as keyboard 96 and pointing device 98. Other input devices (not shown) may include a microphone, joystick, game pad, satellite dish, scanner, or the like. These and other input devices ate often connected to the processing unit 60 through a serial port interface 100 that is coupled to the system bus 64, but may be connected by other interfaces, such as a parallel port, game port, or a universal serial bus (USB). A monitor 102 or other type of display device is also connected to the system bus 64 via an interface, such as a video adapter 104. In addition to the monitor, personal computers typically include other peripheral output devices (not shown) such as speakers and printers.

The server computer 22 is connected to the network 26 through a network interface or adapter 106, a modem 108, or other means for establishing communications over the Internet. The modem 108, which may be internal or external, is connected to the system bus 64 via the serial port interface 100.

Figure 3:
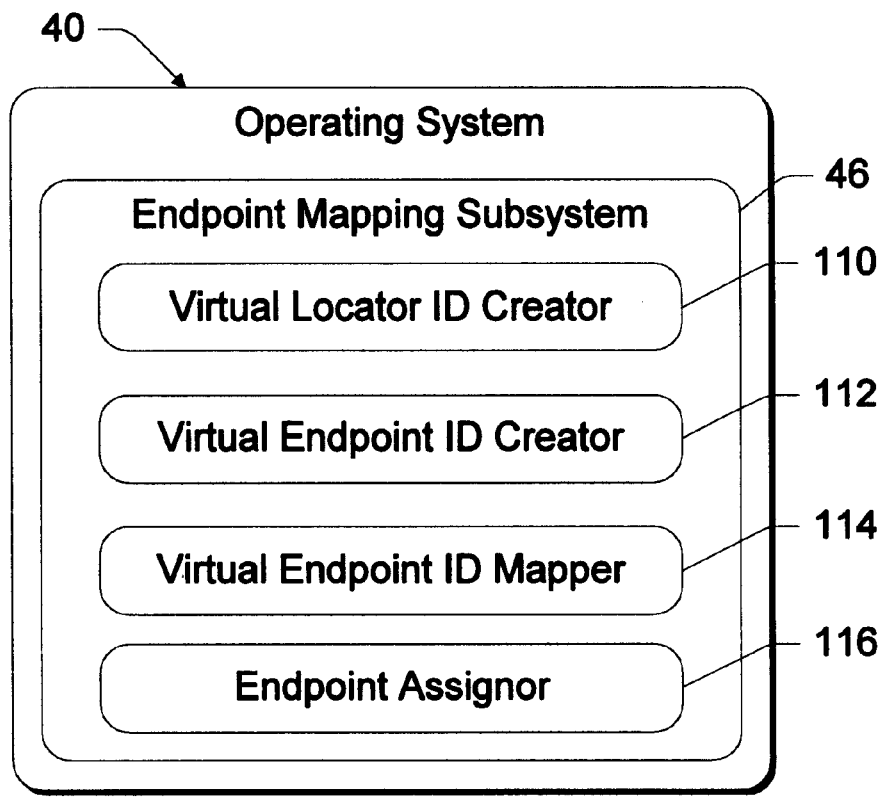
FIG. 3 is a block diagram showing an endpoint mapping subsystem implemented in software as part of a server operating system on the host computer of FIG. 2.

FIG. 3 shows an implementation in which the endpoint mapping subsystem 46 is incorporated into the server operating system 40 on the host server computer 22. The mapping subsystem 46 includes a virtual locator ID creator module 110, a virtual endpoint ID creator module 112, a virtual endpoint ID mapper module 114, and an endpoint assignor module 116.

The virtual locator ID creator 110 creates new network names that can be dynamically mapped to one of several server machines. For NPP, the locator ID creator generates a virtual server name for the named pipe. For TCP/IP or UDP/IP, the locator ID creator defines new IP addresses.

Figure 4:
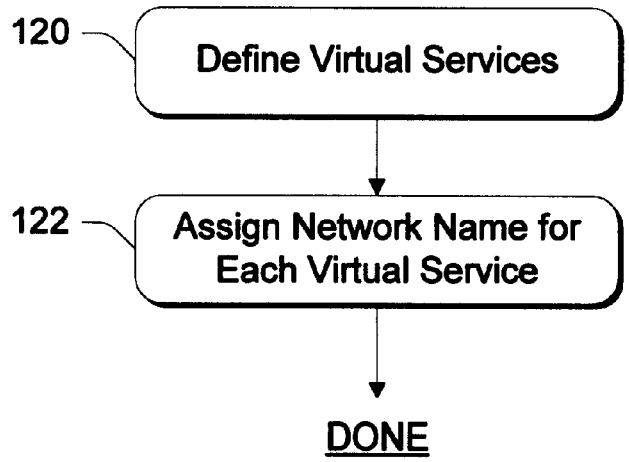
FIG. 4 is a flow diagram showing steps in a method for creating a virtual network name for a virtual service.

FIG. 4 shows steps in a method that is implemented by the virtual locator ID creator 110. At step 120 in FIG. 4, the server uses input from the user or administrator to define the one or more virtual services to be supported by the server 22. For instance, an Internet service provider might wish to define various email post offices that are supported by the same email service, or a number of domain names that are supported by the same Web service.

At step 122 in FIG. 4, the locator ID creator 110 assigns a virtual network name to each of the virtual services. Remote clients use the virtual network names to address requests for the virtual services. It is noted that the locator ID creator 110 may perform this step automatically, or with the assistance of an administrator who assigns network names to the virtual services.

With reference again to FIG. 3, the virtual endpoint ID creator 112 is responsible for creating new endpoint IDs for the virtual services. There is one virtual endpoint ID creator 112 for service type. The endpoint ID creator 112 generates a new endpoint ID based upon the virtual locator ID assigned to the virtual service and the original default endpoint ID that is designated for the service type. The new endpoint ID can be the same as the designated endpoint ID if one service of the service type is running. However, where two or more virtual services are running, new endpoint IDs are created.

In most cases, the new endpoint ID will be different from the designated endpoint ID for the service type. In the NPP context, the virtual endpoint ID creator 112 defines, for each virtual service, a new named pipe name given the designated named pipe name for the service type and the server name. For TCP/IP or UDP/IP, the endpoint ID creator 112 generates new port IDs from the designated port ID and the IP address.

Figure 5:
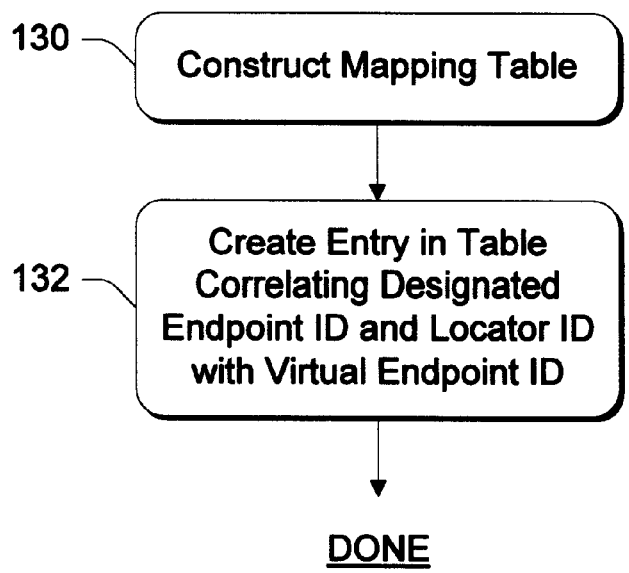
FIG. 5 is a flow diagram showing steps in a method for creating new endpoint IDs.

FIG. 5 shows steps in an exemplary method implemented by the endpoint ID creator module 112 to correlate new endpoint IDs with the original locator IDs and designated endpoint IDs contained in the client requests. At step 130, the endpoint ID creator 112 constructs a table or other data structure. The table has a first field to hold the locator ID, second field to hold the designated endpoint ID, and a third field to hold the new endpoint ID. When a new endpoint is assigned to an existing endpoint ID, the endpoint ID creator 112 adds a new entry to the table (step 132). The entry can be deleted from the table when the endpoint is closed.

In another implementation, the mapping is fixed and there is no need for a mapping table. This implementation has the benefit of being more streamlined because the process does not involve lookup operations. However, a fixed mapping system is not as flexible or adaptable, which is a disadvantage in comparison to the table approach.

FIG. 6a shows a mapping table 140 or other data structure that stores a new endpoint ID in association with the locator ID and designated endpoint ID from which it is derived. The mapping table 140 has a first field for the locator ID, second field for the designated endpoint ID, and a third field for the new endpoint ID. FIGS. 6b and 6c show examples of mapping tables used in the NPP and TCP/IP (or UDP/IP) contexts. In FIG. 6b, a mapping table 142 is constructed for the named pipe protocol to correlate the server name and designated named pipe name with the new named pipe name to which they map. In FIG. 6c, a mapping table 144 is arranged for TCP/IP or UDP/IP to correlate the IP address and designated port number with the new port number to which they map. Using these tables, the host can map an incoming destination address to an internal or relative address that correctly routes the requests to the appropriate virtual services.

FIG. 6d shows another implementation in which a second table 146 is used to determine preliminarily whether the designated endpoint ID is mapped at all. In this example, the second table 146 is used in conjunction with the mapping table 144 from FIG. 6c. She second table 146 lists the assigned port IDs to determine whether a particular port ID has been mapped to a new port ID. If so, the mapping table 144 is consulted to determine the new port ID.

With reference to FIG. 3, the virtual endpoint ID mapper 114 maps incoming client requests to the appropriate new endpoint IDs so that the requests are passed to the intended virtual services. When a client request is received at the server 22, the virtual endpoint ID mapper 114 uses the mapping table 140 to convert from the old locator ID and designated endpoint ID to the virtual endpoint ID for the virtual service to which the request is directed.

The endpoint assignor 116 assigns the virtual endpoint ID to an existing endpoint (e.g., named pipe queue, socket). Another data structure can be configured to associate the virtual endpoint ID with the endpoint, although this may be implicit in the mapping table in that endpoint IDs specify particular endpoints. The endpoints are previously created using existing operating system functions. For example, in the named pipe protocol context, the function call "CreateNamedPipe" forms a queue data structure for a named pipe. The queue data structure implements the pipe structure that passes data to and from a client, either in requests or bytes. In the TCP/IP and UDP/IP contexts, the operating system opens a socket to define the endpoint.

Figure 7:
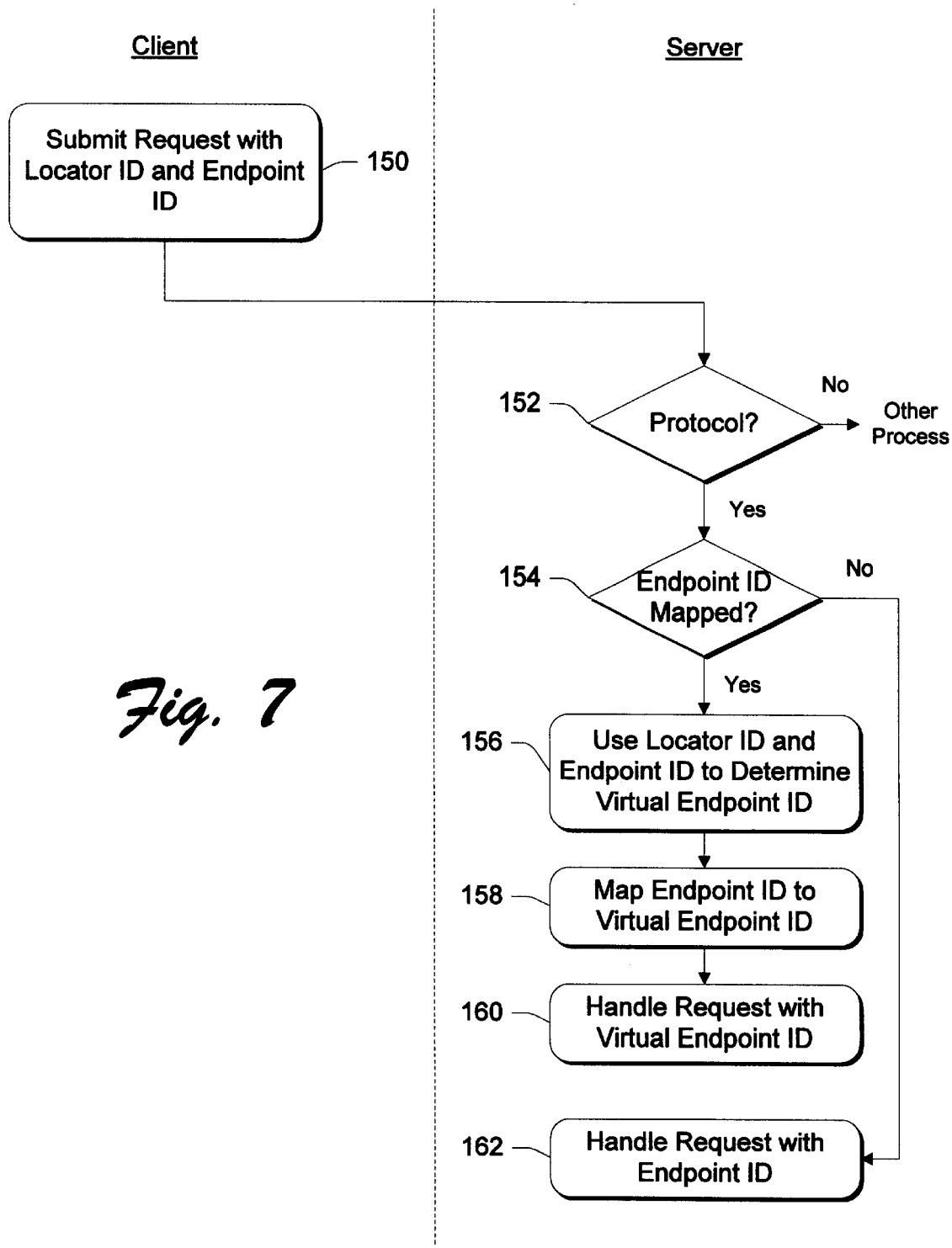
FIG. 7 is a flow diagram showing steps in a method for mapping client requests for virtual services from a designated endpoint to relative endpoints set up for the virtual services.

FIG. 7 shows steps in the process for handling client requests, including both instructions executed at the client and instructions executed at the server. The endpoint ID mapper 114 implements the server-side process steps.

At step 150 in FIG. 7, a client computer submits a request to the server. The request contains a locator ID (e.g., server name, IP address) and an endpoint ID (e.g., named pipe name, port ID). The server evaluates whether the request is of a certain protocol (step 152). If it is, the server determines whether the endpoint ID contained in the request is mapped to a virtual endpoint ID (step 154). This step can be performed by looking up the endpoint ID in the second table 146 and determining whether it is mapped or not.

Assuming it is mapped to a virtual endpoint ID (the "yes" branch from step 154), the server uses the mapping table 140 to determine the virtual endpoint ID associated with the endpoint ID contained in the request (step 156). The server then converts the request to specify the virtual endpoint ID (step 158). The request is then passed onto the appropriate virtual service for handling (step 160).

On the other hand, in the event that the endpoint ID is not mapped to a virtual endpoint ID (the "not" branch from step 154), the request is handled using the original endpoint ID (step 162).

After an endpoint and virtual endpoint ID is specified for communication with the client, all subsequent client requests contain the virtual endpoint ID and the server ascertains the endpoint from the virtual endpoint ID. Alternatively, the server may pass a handle back to the client, which can be used to directly locate the endpoint for subsequent communication.

The processes described herein may also be used to accommodate remote service operations, such as starting a process, stopping a process, and other operations that may be initiated remotely from the server. Typically, the server operating system assigns one endpoint to listen to remote service operations. If one client sends a request to stop a virtual service, the operating system interprets that request to stop the service itself (which might be supporting multiple virtual services), rather than; the desired single virtual service. To avoid this problem, the endpoint mapping subsystem can be used to translate service operation requests to the appropriate named pipes set up for the individual virtual services. In this manner, the clients can direct service operation requests to specific virtual services, without affecting other virtual services.

The endpoint mapping subsystem is particularly well suited for fault tolerant systems in computer clusters. When a node of a computer cluster fails, the services supported by the failed node are shifted to another node. In the event that this transfer results in running two versions of the same service, the endpoint mapping subsystem implemented on the non-failed node accommodates client requests to the two different versions.

Figure 8:
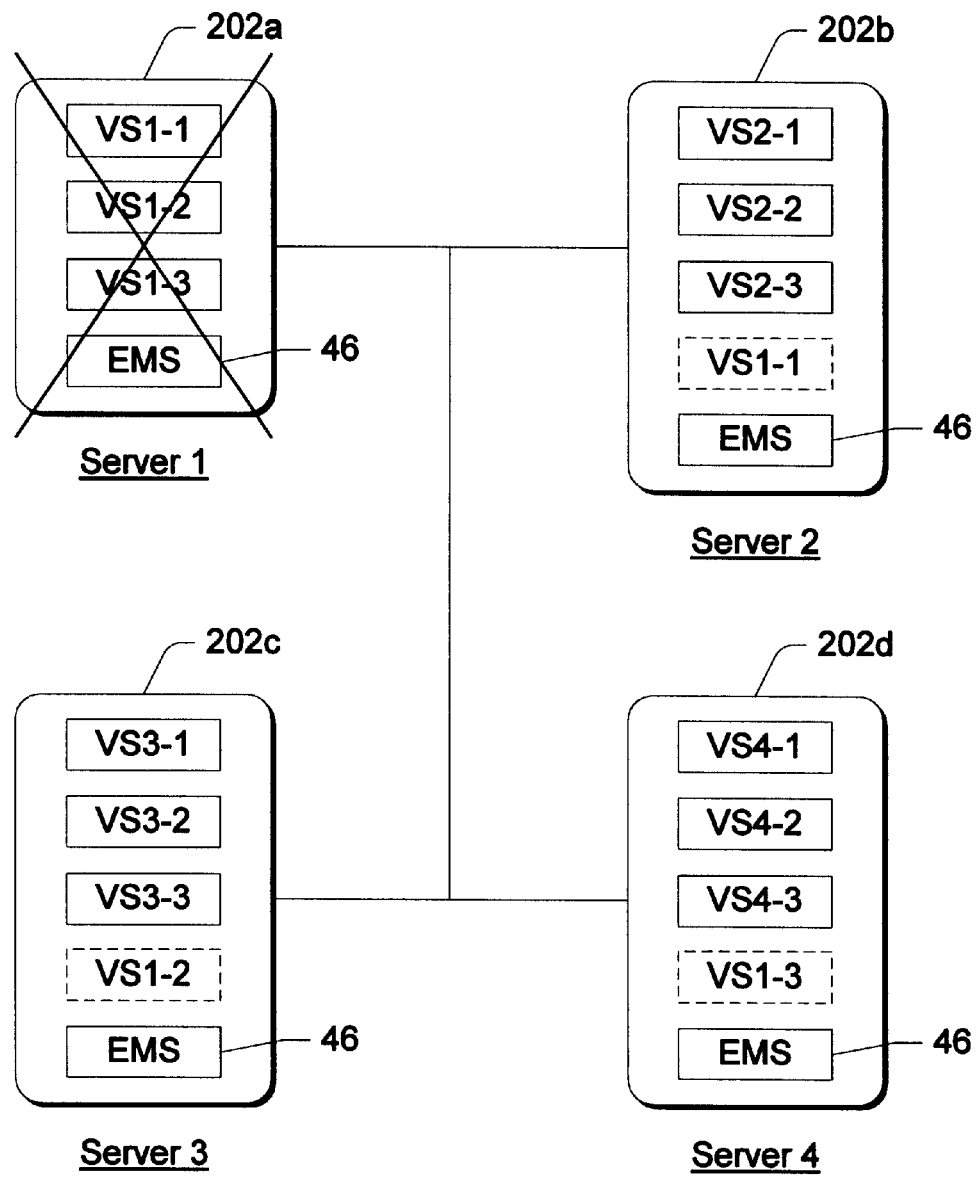
FIG. 8 shows a computer cluster in which the endpoint mapping subsystem of FIG. 3 is used in the context of fault tolerant systems.

FIG. 8 shows a computer cluster 200 having four interconnected servers 202a–202d. Each sever runs multiple virtual services "VS". Each server is implemented with the endpoint mapping subsystem 46 and a failover system (not shown), both of which may be incorporated into the operating system. Now, assume that one of the servers, say server 202a, crashes. As part of the fault tolerant system, the virtual services VS1-1 to VS1-3 from the failed server 202a are transferred to the surviving servers 202b–202d, as indicated by the dashed blocks located on each of the surviving servers.

When a new client request is received at the cluster 200 following failure of server 202a, the failover system routes the request to the appropriate surviving server. This rerouting is conventional and well-known in the failover technology. Once the request for a virtual service VS1-1 reaches the surviving server 202b, the endpoint mapping subsystem uses the locator ID and endpoint ID contained in the request to map to a virtual endpoint ID and corresponding endpoint at the surviving server 202b. The mapping process is the same as described above.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A network server system for handling requests for a service from one or more clients, the network server system comprising:

a processing unit;

a memory subsystem;

a service stored in the memory subsystem and executable on the processing unit, the service being configured to receive requests from the clients via a designated endpoint ID;

the service supporting multiple virtual services that can be individually requested by the clients using virtual network names for the virtual services; and an endpoint mapping subsystem to map the virtual network names contained in client requests for the virtual services to virtual endpoint IDs that are different than the designated endpoint ID and are associated with the requested virtual services.

2. A system as recited in claim 1, wherein the endpoint mapping subsystem comprises:

a virtual endpoint ID creator to define the virtual endpoints associated with the requested virtual services; and a virtual endpoint ID mapper to map the virtual network names to the virtual endpoints associated with the requested virtual services.

3. A system as recited in claim 1, further comprising a network server operating system stored in the memory subsystem and executed on the processing unit, the endpoint mapping subsystem being implemented as part of the network operating system.

4. A system as recited in claim 1, further comprising a dynamic-link library stored in the memory subsystem, the endpoint mapping subsystem being implemented as part of the dynamic-link library.

5. A network server cluster for handling requests from one or more clients, the server cluster having multiple interconnected servers, whereby each server comprises:

a processing unit;

a memory subsystem;

a service stored in the memory subsystem and executable on the processing unit, the service being configured to receive requests from the clients via a designated endpoint ID;

the service supporting multiple virtual services that can be individually requested by the clients using virtual network names for the virtual services;

an endpoint mapping subsystem to map the virtual network names contained in client requests for the virtual services to virtual endpoint IDs that are different than the designated endpoint ID and are associated with the requested virtual services; and whereby in an event that one of the servers in the network server cluster fails and the viral services on the failed server are transferred to various surviving servers, the endpoint mapping subsystem mapping the virtual network names contained in the client requests for the transferred virtual services to virtual endpoint IDs used at the surviving servers to locate the transferred virtual services.

6. An endpoint mapping component for use in a network server, the network server prodding a service that receives requests from clients via a designated endpoint ID, the service supporting multiple virtual services that can be individually requested by the clients using virtual network names assigned to the virtual services, the Endpoint mapping component comprising:

a virtual endpoint ID creator to define a virtual endpoint ID for a virtual service that is requested by a client, the virtual endpoint ID being different from the designated endpoint ID, the virtual service having a corresponding virtual network name that is contained in the client request; and a virtual endpoint ID mapper to change the virtual network name of the virtual service to the virtual endpoint ID that is created by the virtual endpoint ID creator for the requested virtual service so that the client request containing the virtual network name is passed to the requested virtual service.

7. A named pipe mapping component as recited in claim 6, wherein the virtual endpoint ID creator makes an entry in a data structure that associates the virtual endpoint ID with the designated endpoint ID.

8. A named pipe mapping component as recited in claim 6, further comprising a data structure to associate the virtual endpoint ID with the designated endpoint ID.

9. A named pipe mapping component as recited in claim 6, wherein the virtual network name includes a locator ID and the designated endpoint ID, and further comprising a data structure to associate the virtual endpoint ID with the locator ID and the designated endpoint ID.

10. A network server operating system embodied on a computer-readable medium comprising the endpoint mapping component as recited in claim 6.

11. A dynamic-link library embodied on a computer-readable medium comprising the endpoint mapping component as recited in claim 6.

12. A virtual endpoint ID creator module embodied as a computer program on a computer-readable medium, the virtual endpoint ID creator module being implemented in a network server connected to serve one or more clients over a computer network system, the network server providing a service that receives requests from the clients via a designated endpoint ID, the service supporting multiple virtual services that can be individually requested by the clients, the virtual endpoint ID creator module comprising:

first code means for creating a virtual endpoint ID based at least in part on the designated endpoint ID for use with a corresponding virtual service; and second code, means for associating the virtual endpoint ID with the designated endpoint ID so that receipt of a client request specifying the designated endpoint ID can be mapped to the virtual endpoint ID for handling by the corresponding virtual service.

13. A network server operating system embodied on a computer-readable medium comprising the virtual endpoint ID creator module as recited in claim 12.

14. A dynamic-link library embodied on a computer-readable medium comprising the named pipe creator module as recited in claim 12.

15. A virtual endpoint ID mapper module embodied as a computer program on a computer-readable medium, the module being implemented in a network server connected to serve one or more clients over a computer network system, the network, server providing a service that receives requests from the clients via a designated endpoint ID, the service supporting multiple virtual services that can be individually requested by the clients, the virtual endpoint ID mapper module comprising:

first code means for ascertaining a predefined virtual endpoint ID that is associated with a virtual network name contained in the client request for a particular virtual service; and second code means for using the virtual endpoint ID to locate the particular virtual service.

16. A virtual endpoint ID mapper module as recited in claim 15, further comprising third code means for looking up the virtual endpoint ID in a table that correlates the virtual endpoint ID with the virtual network name.

17. A virtual endpoint ID mapper module as recited in claim 15, wherein the virtual endpoint ID specifies a corresponding endpoint, further comprising third code means for returning a handle for the endpoint to the client making the request.

18. A network server operating system embodied on a computer-readable medium comprising the virtual endpoint ID mapper module as recited in claim 15.

19. A dynamic-link library embodied on a computer-readable medium comprising the virtual endpoint ID mapper module as recited in claim 15.

20. A network server operating system for execution on a network server that is configured to serve one or more clients over a computer network system, the network server providing a service that receives requests from the clients via a designated endpoint ID, the service supporting multiple virtual services that can be individually requested by the clients using virtual network names for the virtual services, the virtual network names containing in part the designated endpoint ID, the network server operating system being implemented with an endpoint mapping subsystem to map the virtual network names in the client requests to predefined virtual endpoint IDs that are different than the designated endpoint ID and are associated with the requested virtual services.

21. A network operating system as recited in claim 20, wherein the endpoint mapping subsystem establishes an endpoint that corresponds to the virtual endpoint ID.

22. A network operating system as recited in claim 20, wherein the endpoint mapping subsystem establishes a data structure that correlates the virtual endpoint IDs with the virtual network names.

23. In a network server having a service that receives requests from clients via a designated endpoint ID, the service supporting multiple virtual services that can be individually requested by the clients, a method comprising the following steps:

creating a virtual endpoint ID for a virtual network name associated with a particular virtual service;

associating the virtual endpoint ID with the virtual network name; and in response to a client request for the virtual service, mapping the virtual network name contained in the client request to the virtual endpoint ID for the virtual service.

24. A method as recited in claim 23, wherein the creating step comprises the step of correlating the virtual endpoint ID with the virtual network name in a data structure.

25. A method as recited in claim 23, wherein the virtual network name includes a locator ID and the designated endpoint ID, further comprising the step of correlating the virtual endpoint ID with the locator ID and the designated endpoint ID using a lookup table structure.

26. A computer-readable medium having computer-executable instructions for performing the steps in the method as recited in claim 23.

27. In a network server having a service that receives requests from clients via a designated endpoint ID, the service supporting multiple virtual services that can be individually requested by the clients using virtual network names assigned to the virtual services, a method comprising the following steps:

creating a virtual endpoint ID based at least in part on the designated endpoint ID for use With a corresponding virtual service; and associating the virtual endpoint ID with the designated endpoint ID so that receipt of a client request specifying the designated endpoint ID can be mapped to the virtual endpoint ID for handling by the corresponding virtual service.

28. A method as recited in claim 27, wherein the creating step comprises the step of correlating the virtual endpoint ID with the virtual network name in a data structure.

29. A computer-readable medium having computer-executable instructions for performing the steps in the method as recited in claim 27.

30. In a network server having a service that receives requests from clients via a designated endpoint ID, the service supporting multiple virtual services that can be individually requested by the clients using virtual network names assigned to the virtual services, a method comprising the following steps:

ascertaining a predefined virtual endpoint ID that is associated with a virtual network name contained in the client request for a particular virtual service; and using the virtual endpoint ID to locate the particular virtual service.

31. A computer-readable medium having computer-executable instructions for performing the steps in the method as recited in claim 30.

32. In a network server cluster having multiple servers, each server supporting at least one service that receives requests from clients via a designated endpoint ID, the service supporting multiple virtual services that can be individually requested by the clients, wherein in an event that one server in the cluster fails and the virtual services on the failed server are transferred to surviving servers, a method comprising the following steps:

creating a virtual endpoint ID for a virtual network name associated with a transferred virtual service, wherein the transferred virtual service originally resided on the failed server but now resides on one of the surviving servers;

associating the virtual endpoint ID with the virtual network name; and in response to receiving a client request for the transferred virtual service at the one surviving server, mapping the virtual network name contained in the client request to the virtual endpoint ID for the transferred virtual service.

* * * * *

UNITED STATES PATENT AND TRADEMARK OFFICE
CERTIFICATE OF CORRECTION

PATENT NO. : 6,247,057 B1　　　　　　　　　　　　　　　　　　　Page 1 of 1
DATED : June 12, 2001
INVENTOR(S) : Barrera, III It is certified that error appears in the above-identified patent and that said Letters Patent is hereby corrected as shown below:

Column 1,
Line 41, change "oh" to -- on --.

Column 2,
Line 56, change "ode" to -- one --.

Column 4,
Line 17, change "ant" to -- and --.
Line 26, change "serve" to -- server --.
Line 35, change "transport" to -- Transport --.

Column 6,
Line 38, change "vital" to -- virtual --.

Column 7,
Line 58, change "ate" to -- are --.

Column 9,
Line 23, change "She" to -- The --.

Column 10,
Line 2, change "not" to -- no --.

Column 14,
Line 9, change "With" to -- with --.

Signed and Sealed this

Fifteenth Day of January, 2002

Attest:

JAMES E. ROGAN
*Attesting Officer*　　　*Director of the United States Patent and Trademark Office*